Sept. 17, 1963  F. HAALCK  3,103,820
APPARATUS FOR RECORDING GEOPHYSICAL DATA
Filed March 18, 1960  5 Sheets-Sheet 1

INVENTOR
Fritz Haalck

Sept. 17, 1963  F. HAALCK  3,103,820
APPARATUS FOR RECORDING GEOPHYSICAL DATA
Filed March 18, 1960  5 Sheets-Sheet 5

INVENTOR
Fritz Haalck

United States Patent Office

3,103,820
Patented Sept. 17, 1963

3,103,820
APPARATUS FOR RECORDING
GEOPHYSICAL DATA
Fritz Haalck, Berlin-Wilmersdorf, Germany, assignor to Continental Elektroindustrie A.G., Askania-Werke, Berlin-Mariendorf, Germany, a corporation of Germany
Filed Mar. 18, 1960, Ser. No. 15,904
Claims priority, application Germany Mar. 20, 1959
6 Claims. (Cl. 73—382)

This invention relates to apparatus for determining geophysical data, such as local variations of gravity, on board of a vehicle, for instance on board a ship or airplane. Gravimeters have been developed for such use. They measure the relatively minute changes of gravity, in spite of the relatively major disturbance caused by tilting (pitch, roll and/or yaw) of the ship or plane. For this purpose such gravimeters are designed as modified dynamic-static gravimeters. A gravimeter mass is supported for motion with a single degree of freedom in the supporting system, and with strong damping. During measurements conducted on the tilting vehicle or platform the mass oscillates about a null position. Measurements of such oscillations furnish a measurement of the local gravity.

In actual use it has been found difficult to obtain adequate measurements of oscillations, because of displacements of the null point in response to the geographic translation of the vehicle.

The invention has overcome this difficulty. Briefly described, it provides for this purpose a null point correcting system, adapted to eliminate from the measured and recorded oscillations that element of measurement which is due to the geographic translation of the system.

Figure 1:
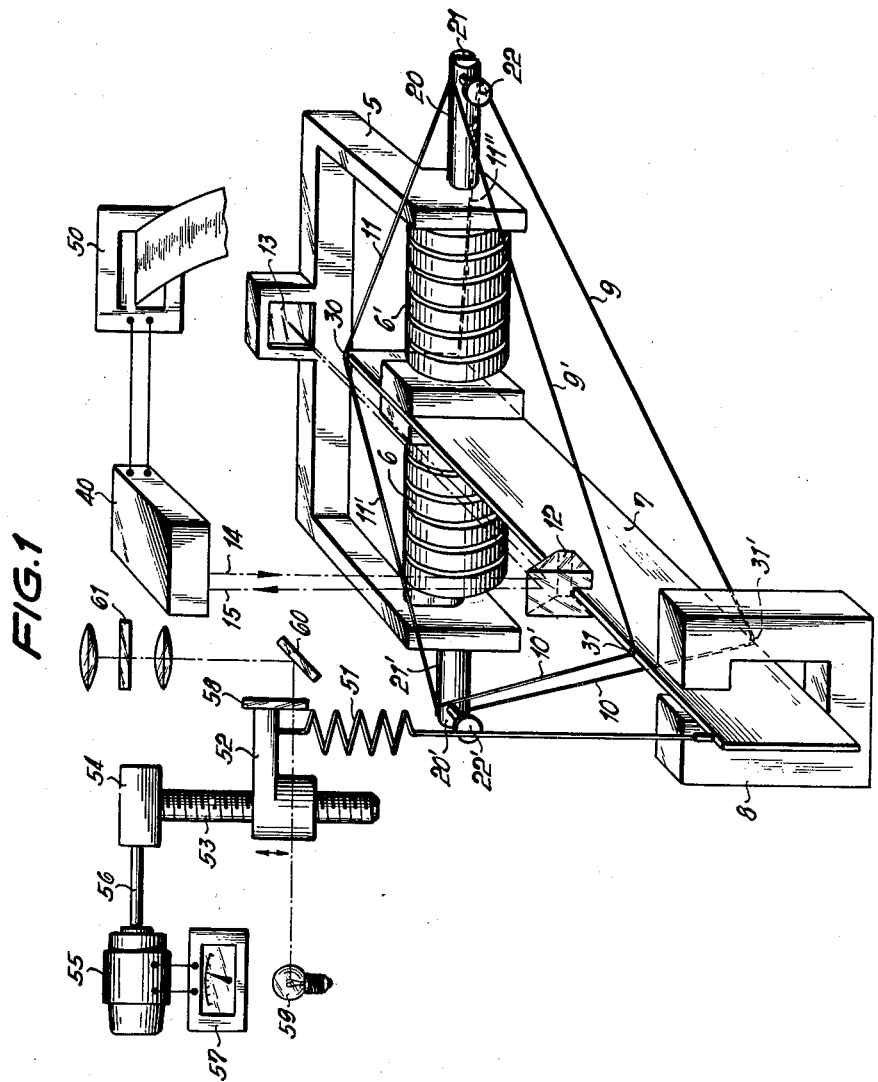
Figure 2:
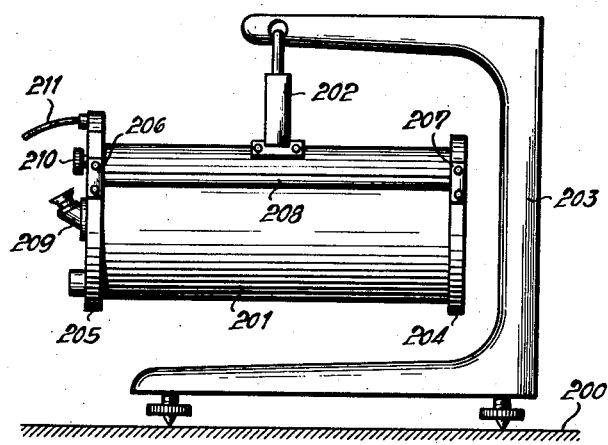
Figure 3:
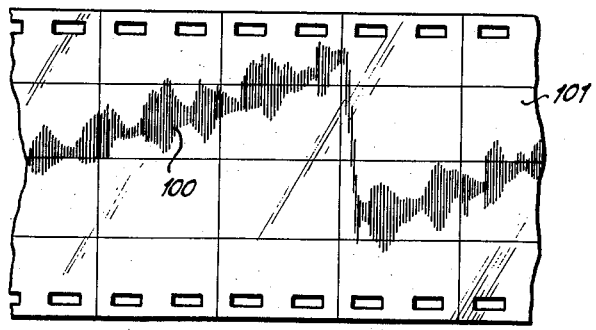
Figure 4:
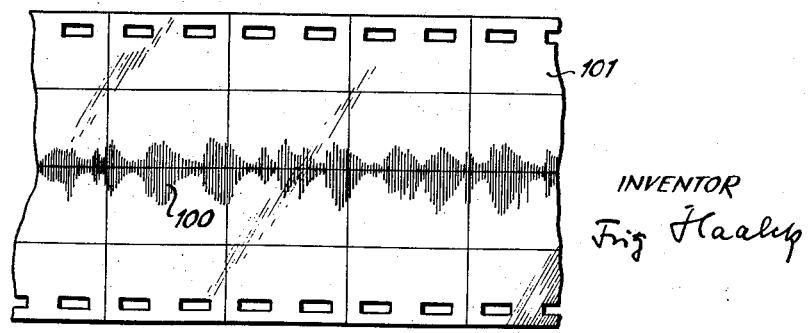
Figure 5:
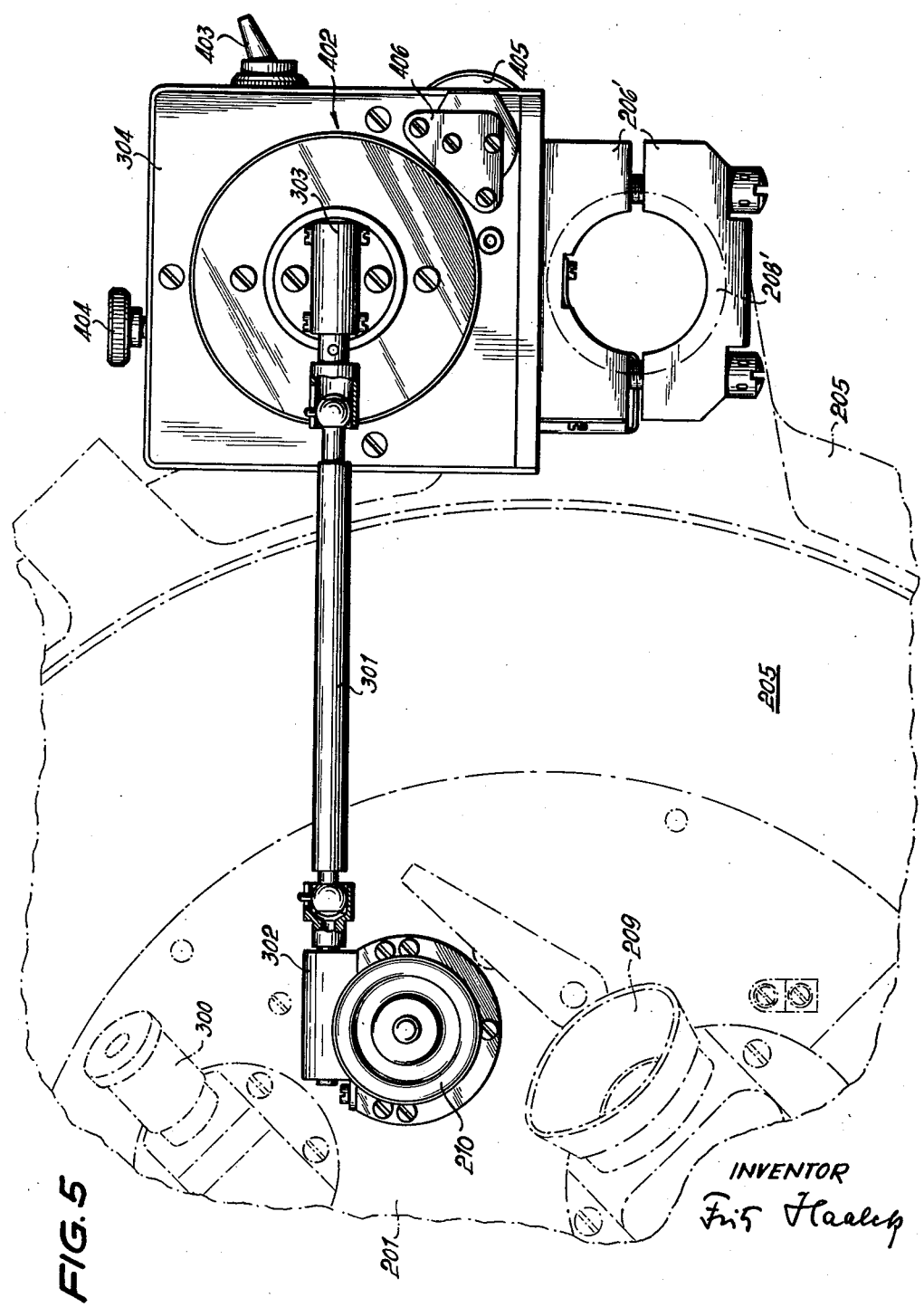
Figure 6:
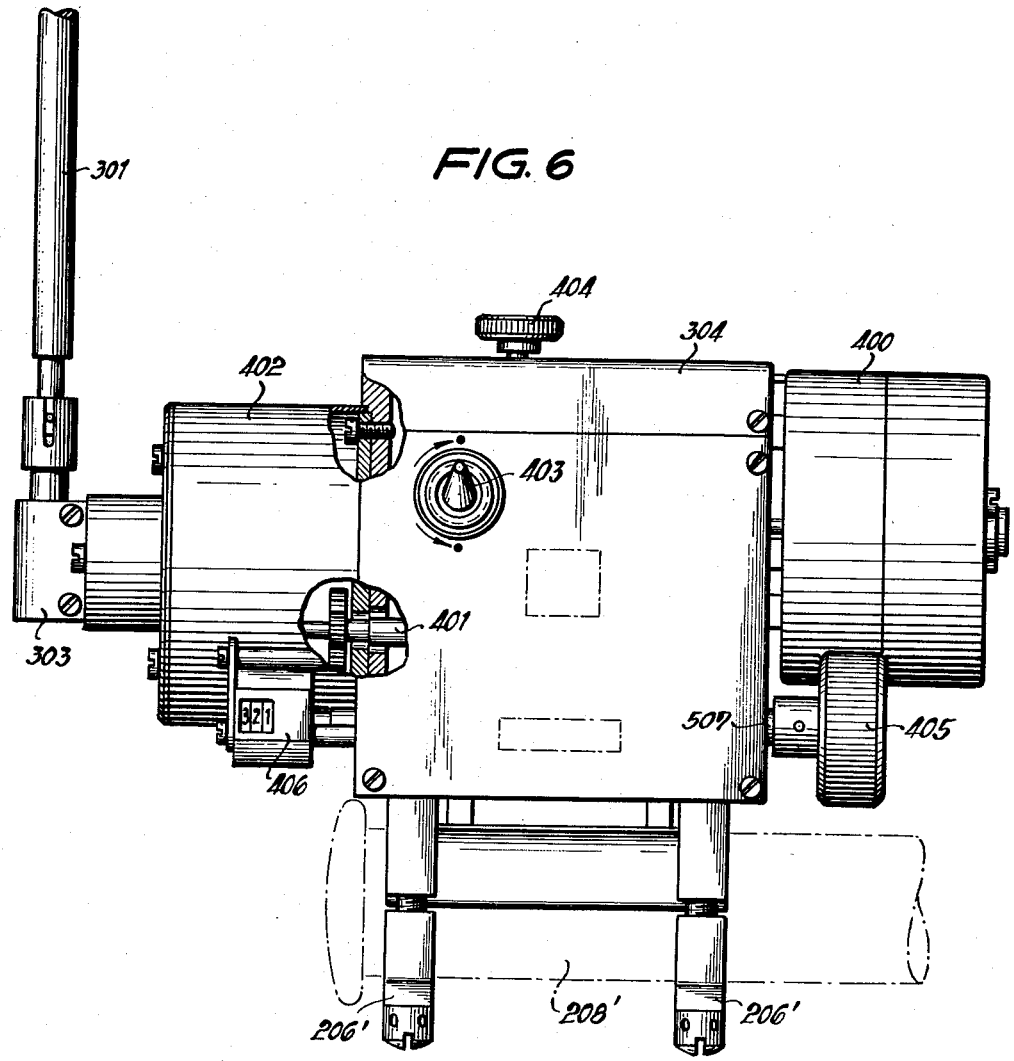
Figure 7:
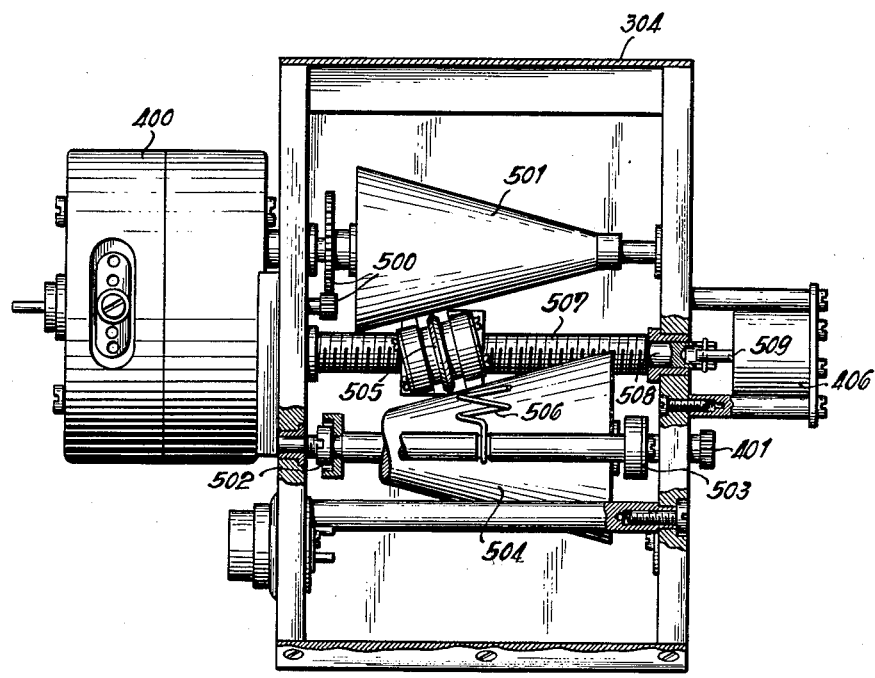

The details will best be described as applied to the preferred instrument, which is shown in the drawing. FIGURE 1 is a partly perspective, partly elevational view of the entire instrument. FIGURE 2 is a side view of a housing for the instrument, with support means for the housing. FIGURE 3 is a fragmentary representation of a gravity record, such as has been available from the most advanced instruments hitherto available. FIGURE 4 is a generally similar representation of such a record as available from the new instrument. FIGURE 5 is a partial end view of a front plate in FIGURE 2 and of equipment thereon. FIGURES 6 and 7 are respectively, a righthand side view of the equipment of FIGURE 5 and a lefthand sectional view of part thereof.

Referring to FIGURE 1, a frame 5 has outer ends of two helical, coaxial and aligned torsion springs 6, 6' secured thereto, while the other, mutually adjacent ends of said springs are secured to the gravimeter mass 7, shown as a plate disposed in a vertical plane. The springs are pre-torsioned so that they elastically support the mass, the value of gravity of the mass and the common axis of the two springs being disposed in a substantially horizontal plane.

In order to allow the system to operate on moving vehicles the motion of the mass is limited to a single degree of freedom relative to frame 5 and particularly to oscillating motion in a vertical plane, thus eliminating the effect of horizontally effective forces. Mass 7 accordingly has filaments 9, 9' and 10, 10' secured to points of the mass, lying in the vertical plane of motion, remotely from the spring axis, opposite ends of said filaments being secured to frame 5 remotely from said plane and preferably in the spring axis or adjacent thereto; and additional filaments 11, 11' and 11" (only one of the latter being shown) are used in connection with points on said mass opposite those secured to 9 etc. These filaments are threads or ribbons of substantially non-stretchable material, which are secured to the gravimeter mass or plate for instance at the points shown at 30, 31, 31' and a point below 30; securement to such points being had for instance by welding, soldering, cementing, clamping, or the like. The free ends of the filaments, after such securement, are secured to pegs 20, 20' attached to frame 5, which pegs have slots 21, 21' receiving the ends of filaments or tensioning springs 9 etc., screws 22, 22' being used to fix these tensioning wires in the slots.

Damping of mass 7 is provided by eddy currents, created in a known way by damping magnet 8.

The gravimeter operates dynamically or as a pendulum, in the vertical plane, under the effect of the various forces, occurring incident to the motion of the vehicle and effective in said plane and constantly and currently determines the local value of gravity. The pendulum motion of the mass is recorded and from such record, the local value of gravity is determined, by procedures which have been disclosed elsewhere and which of course involve a number of details, such as correction of the measurement for the Browne effect, which need not be discussed herein. The recording of the oscillation of mass 7 is performed with the aid of an inclined reflector 12 on the mass and a vertical reflector 13 on frame 5: a light beam 14 is directed to reflector 12, reflected to 13, back to 12 and as returning beam 15 to a device 40, comprising a suitable photoelectrical transducer (not shown), such as a differential photocell device, for representing the variable positions of beam 15 as a variable electrical potential. This potential, after suitable amplification in a well-known circuit (not shown) is recorded by recorder 50 of known construction and which includes a potential recording pen movable transversely across the record strip.

Records of the contemplated type are schematically shown in FIGURES 3 and 4, the latter being of the type as desired and as provided in accordance with the invention. It will be understood that it comprises a curve which oscillates about a horizontal line, used as null position, the successive oscillations of the curve having center points above or below said null position and thereby furnishing the desired gravity values. In FIGURE 3 there is shown the curve hitherto obtained when the vehicle moved in any direction other than a strict east-west line: the null position of curve 100 is a line oblique to the horiztonal center line and marginal lines of the record strip. The obliquity of this line, here an upward shift of the null position, from left to right, is dependent on the direction and velocity of the vehicle. At typical velocities of ships travelling from north to south it amounts to about 20 mgal per hour, and at typical velocities of relatively slow airplanes, about 300 mgal per hour, in middle latitudes. Continuation of recording of gravity is soon interrupted by this effect: the record leaves the recording strip. On the other hand, modern sensitive instruments of the contemplated type have a measuring range of about 60 mgal. Thus it becomes necessary, in the instruments hitherto used, frequently to readjust the potential-recording pen relative to the record strip, or otherwise to shift the null point, thereby interrupting the desired recording process. The interruption is particularly disturbing since the instrument usually requires about 4 to 5 minutes to regain proper operation. The overall effect was that hitherto, the desired measurement was hardly possible in rapid vehicles, such as airplanes. Not only was it difficult to evaluate the generally rising curve of FIGURE 3, the rise of which was dependent on variables; the record was also unpredictably interrupted, not only at but often far beyond the position shown at the third vertical fixed line from left.

In order to obtain the record of FIGURE 4, the new instrument uses a soft adjustment spring 51, FIGURE 1, disposed between the oscillating mass 7 and a non-oscillating structure 52, this structure being shiftable along the axis of spring 51, which axis is vertical. A precision screw 53 effects the shifting, rotation of structure 52 being prevented by suitable means (not shown). Screw 53 is driven by drive 54, actuated by output shaft 56 of a motor 55. Velocity and direction of rotation of the motor can be adjusted by a suitable control 57 and the shifting of structure 52 can be observed on a scale 58, illuminated at 59 and read, by means of reflector 60, in comparison with a fixed scale 61. Adjustment of screw 53 operates directly through spring 51 to amplify or dampen oscillation of mass 7 and effects zero point correction.

The apparatus operates as follows. In middle latitudes the normal value of gravity varies by about .8 mgal per kilometer in north-south directions. Assuming that the vessel moves at $v$ kilometers per hour under angle $a$ relative to the north-south line, normal gravity changes by $.8v \cos a$ mgal per hour. Assuming further that the gravimeter indication changes by A mgal per revolution of screw 53 it will be seen that compensation of the null position requires rotation of said screw $an$ r.p.h., where $n$ equals $(.8v \cos a)/A$. Since angle $a$ and velocity $v$ can be determined readily and accurately, it will be seen that the indicated rotation $n$ provides greatly improved measurement of gravity.

Referring to FIGURE 2, the instrument is placed on a platform 200 disposed on the moving vehicle and it is preferred that such platform be stabilized by gyroscope or the like. The instrument itself is disposed in a drum-like housing 201, suspended by universal joint means 202 from stand 203. Drum 201 has end plates 204 and 205, the latter plate being a front element of the apparatus, with supervision means thereon. Fasteners 206, 207 connect plates 204, 205 with carrying rods 208, only one being visible in FIGURE 2. The front plate carries an ocular 209, shown in FIGURE 1 directly above fixed scale 61. It also carries a knob 210 for adjustment of drive 54 shown in FIGURE 1, the interconnecting means (not shown) being of any desired kind. Cable 211 feeds energy to lamp 59 shown in FIGURE 1, also to thermostat devices and the like if desired, and additionally serves to feed the potential from transducer 40 of FIGURE 1 to the recorder.

The illustrated apparatus can be controlled by hand or by direction and speed controlling equipment (not shown), such as often provided in vehicles and which can suitably readjust the control means 57 of FIGURE 1.

Modifications are also available. For instance, in lieu of a fixed-ratio transmission 54 of FIGURE 1 a transmission of variable ratio can be used and the motor can then rotate with fixed velocity. FIGURES 5, 6 and 7 show a friction wheel transmission for rotating screw 53 of FIGURE 1, subject to manual readjustment by knob 210 of FIGURE 2. In FIGURE 5, ocular 209 has been shown in tilted position, to conserve space. An added inspection device 300 serves to observe spirit level devices and the like in housing 201 of FIGURE 2. Knob 210 is normally rotated by output shaft 301 of the motor drive, through worm gear drive 302; the motor drive being provided in box 304, which is supported on carrying rod 208' and has a cone wheel at 303. (In FIGURE 6, shaft 301 has been turned by 90 degrees.) The motor driving variable speed transmission is shown at 400. Drive box 304 has shaft 401 extending therefrom which operates cone wheel 303 by a substantially fixed ratio transmission 402, while knob 405 allows variation of the transmission ratio in 304. (Motor 400 is controlled by off-on switch 403 and direction knob 404.) A counter 406 shows the transmission ratio. As further shown in FIGURE 7 the shaft of motor 400 drives, via gear 500, the shaft of cone 501. A second cone 504 is journalled in bearings 502, 503; it is driven from cone 501 via shiftable friction roller 505, which is held against cone 504 by spring 506 and is shiftable by knob 405 along axle 507, for stepless change of transmission ratio. Counter 406 is driven by coupling 508 and drive 509. The fixed ratio unit 402 has been omitted in FIGURE 7. It is exchangeable, so that the other instrument parts can be used on slow as well as fast vehicles.

In lieu of the illustrated null point control in the gravimeter itself, a null point control can be used in recorder 50 of FIGURE 1, which can shift the null position of the record strip, relative to the writing device, for instance by superimposition of a known direct current unit.

According to another modification the automatic shifting of the null position, in response to speed and direction of the vehicle, can be performed intermittently. For instance, when gravity measurements are obtained intermittently, this shift is conveniently obtained in the intervals between such measurements. This applies also when null position is shifted in the recorder.

According to still another modification the shifting of null position, within the gravimeter itself, can be achieved by motorized means acting upon the torsion spring, not on a soft adjustment spring.

According to still another modification a suitable device (not shown) shifts the null point, for instance by readjustment of control means 57 in FIGURE 1, in automatic response to the measured gravity itself. Finally, it will be realized that geophysical data other than gravity, and which depend on geographic location and other variables, can advantageously be measured by the new apparatus. For instance geomagnetism, which basically varies along certain lines (not in this case along strict geographic latitudes or meridians) can be determined in improved ways, from moving vehicles, by apparatus constructed in close analogy to that which has been described in detail.

I claim:

1. Apparatus for measuring and recording local variations of geophysical values dependent on geographic location comprising, a gravity measuring mass located on an unsteady base, means to produce electrically a graphic recording of displacements of the gravity responsive mass relative to a null point, and shifting means responsive to geographic location to vary the displacement of said mass and retain the relationship of the graphic recording to the null point.

2. Apparatus as described in claim 1 including a variable speed drive forming part of said shifting means.

3. Apparatus as described in claim 1 wherein the null point measuring instrument comprises a mass adapted to oscillate with a single degree of freedom and the shifting means comprises a movable element elastically connected with said mass.

4. Apparatus as described in claim 1, wherein the shifting means comprises a movable element and a spring connecting said element with the mass.

5. Apparatus as described in claim 1, wherein visual means is associated with the shifting means.

6. Apparatus for measuring and recording local values of a geophysical quantity which vary with the geographic position of a moving vehicle transporting the apparatus at a certain velocity comprising, in combination, a measuring instrument sensitive to variations of gravity having an elastically suspended mass, means for recording the position of the mass, spring means connected to said mass, motor means acting upon the spring means and varying the effective tension of said spring means continuously thereby changing the forces acting upon the mass in a direction which is contrary to the direction of the force caused by the change in gravity, and control means responsive to geographic location to adjust the speed of said motor means to compensate parts of the local value to be measured which vary in a predetermined and systematical manner with the geographic position of the vehicle.

References Cited in the file of this patent
UNITED STATES PATENTS

| | | |
|---|---|---|
| 2,674,885 | Silverman | Apr. 13, 1954 |
| 2,738,676 | Worden et al. | Mar. 20, 1956 |

OTHER REFERENCES

Graf, German application 1,006,170, printed April 11, 1957 (Kl. 42c 44), 3 pages spec., 3 sheets drawing.